June 4, 1935.  W. H. TROGDON  2,004,020
COTTON-LAP WEIGHT INDICATOR
Filed April 10, 1933
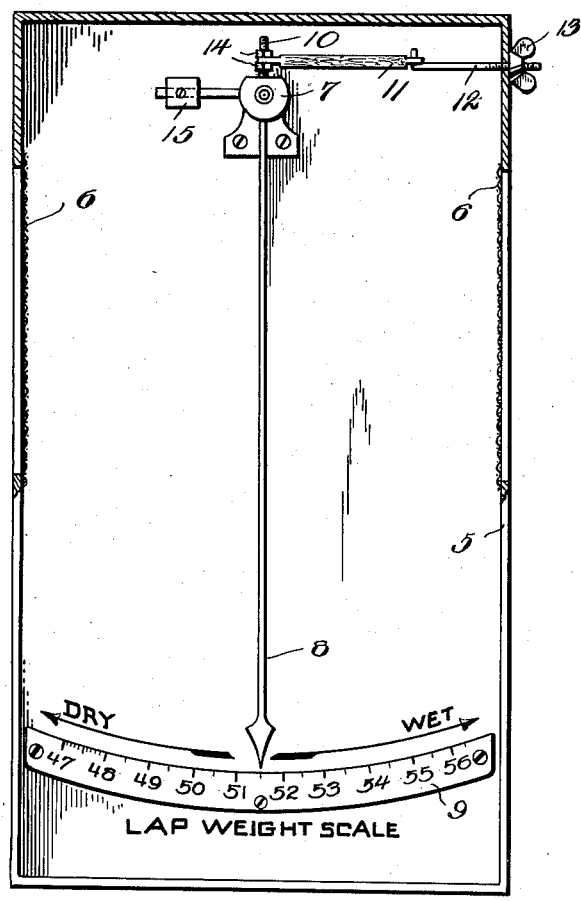
Inventor
W. H. Trogdon
Davis & Davis
By
Attorneys Patented June 4, 1935

2,004,020

UNITED STATES PATENT OFFICE 2,004,020

COTTON-LAP WEIGHT INDICATOR

William Hosah Trogdon Worthville, N. C.

Application April 10, 1933, Serial No. 665,412

3 Claims. (Cl. 73—24)

The object of this invention is to provide a simple instrument, actuated by moisture conditions, to enable the lapper man to readily determine the weight of the lap he will need under the conditions existing at the time of making the lap to produce laps of uniform weight. It is customary in textile mills to endeavor to make the laps of uniform weight in order thereby to avoid certain well known difficulties and troubles in the subsequent manipulation of the lap. At the present time, so far as I am aware, no method is employed which insures that high degree of uniformity in weight, irrespective of moisture content, that is highly desirable in the subsequent manipulation of the lap.

All lap making machines are provided with adjustable evener screws which devices embody means whereby the lapper man may adjust the mechanism for heavier or lighter lap winding on the lap roll. If the moisture conditions in the lap room are exactly at normal so far as humidity is concerned, the laps will all have the same predetermined weight. If, however, the moisture conditions change the lap will contain either too much cotton by weight or too little by weight, according as to whether the humidity is below normal or above normal. My instrument provides a simple means whereby the lapper man may, by watching the instrument, change the weight of lap from time to time to compensate for lack of moisture or for an abnormal amount of moisture in the lap.

The drawing annexed illustrates a front view of a preferred form of my apparatus.

Referring to the drawing by reference characters, 5 is a suitable box or casing in which the devices are located, the walls of this box being provided with opening 6 for ventilation purposes. Pivotally mounted at 7 is a depending pointer 8 whose extreme lower end, when the pointer is moved to one side or the other, works over a stationary scale 9 which is graduated for avoirdupois weights, preferably pounds. The pointer has an extension 10 extending above its pivotal point, and connected to this upward extension 10 is a hygroscopic element 11 which extends laterally from the pointer connection to the extension 10 and is connected to the inner end of a hook 12 which extends in through a hole in the casing 5 and is provided at its outer end with a thumb nut 13. For nicety of adjustment, the inner end of the hygroscope element 11 is connected to the pointer extension by means of a pair of nuts 14 which are threaded upon said pointer extension. Extending laterally from the pointer 8, in a direction opposite the hygroscopic member 11 is a weighted lever 15 which normally tends to tension the hygroscopic element and to swing the pointer 8 toward the heavy, wet end of the scale. With this construction it will be observed that an increase in humidity will increase the length of the hygroscopic element 11 and thus swing the pointer 8 toward the heavy, wet end of the scale, whereas a decrease in moisture in the atmosphere will cause the pointer to swing toward the dry end of the scale. The thumb nut 13 permits the hygroscopic element to be bodily adjusted to thus swing the pointer in either direction regardless of atmospheric conditions.

In practice the thumb nut 13 will be used to adjust the pointer to the figure on the scale plate which indicates the weight of the lap under normal humidity conditions. For instance if a lap of 50 lbs. is desired the device is to be adjusted to bring the pointer to the figure 50 on the scale but this adjustment will be made only when moisture conditions are normal, i. e., when the humidity of the atmosphere and the consequent moisture content of the cotton is that which is accepted in textile mills as normal. So long as the pointer remains at the figure 50 the lapper man knows that moisture conditions are normal and that he does not need to readjust the evener to alter the weight of the lap roll; in other words, he knows that a certain yardage or length of lap under the conditions then prevailing will produce a lap having a weight of 50 lbs. However, should the humidity of the atmosphere change, the pointer 8 will move either to the dry side or to the wet side and the attendant will then have to reset his evener devices to give him a weight of lap that will compensate for the change in the moisture content of the cotton. We may assume for instance, that in Fig. 1 of the drawing the instrument was set for a standard 50 lb. lap and that owing to increase of moisture in the atmosphere and also in the cotton being handled, (lint cotton as is well known being highly hygroscopic) the member 11 has lengthened and thus permitted the pointer to swing over to the number 52 on the scale. A glance at the instrument then will inform the lapper man that he must so adjust the evener devices on the lapper as to put a sufficient additional weight on the lap to make it weigh 52 lbs. in order that in subsequent treatment of the lap, when the moisture content naturally evaporates down to normal, the lap will weigh 50 lbs. In this example it will be seen that if no allowance were made for the increase in the absorption of moisture by the cotton lap the lap would weigh two pounds under standard as soon as the abnormal amount of moisture evaporated from the lap, which it always does during the subsequent manipulation of the lap in the carding and spinning and weaving operations. Should a lap of less than 50 lbs. be desired the thumb nut 13 will be manipulated to swing the pointer over to the dry end of the scale to the figure that will indicate the weight of the lap desired, but this adjustment must always be made when humidity conditions are normal in the lap room.

It will be understood that the abnormal amount of moisture in the lap will be lost by the time the cotton is spun and woven into cloth, so that the weaver will be insured of a correct cloth weight. On the other hand, without the use of my indicator it would be on the light side, which would call for changing draft gears in the spinning operations, and by the time the proper change was made in the spinning room, it would be most likely on the heavy side. Should the regain run below normal the effect would be just the opposite. It will therefore be readily seen that my lap weight indicator will save many times its purchase price in the course of a few days, should the cloth run on the heavy side two or three points; and furthermore my device will practically overcome all of the changing of gears in the spinning room.

It will be understood that the threaded extension 10 and the nuts 14, for adjusting the sensitivity of the instrument, constitute an important feature of my device, the weight scale 9 being fixed or nonadjustable. The heavier the lap the mill is running, the nearer to the pivot 7 must be the connection of the hygroscopic member 11, since greater movement of the pointer 8 is needed when making the heavier laps in order to properly coordinate the moisture-laden lap with the actual weight of the cotton therein. For instance, if a mill be running, say 50 lbs. laps the adjustment of the member 11 to the extension 10 will be so made as to cause the pointer to move to the weight numeral 51 if the moisture conditions in the lap room are such that an extra pound of water is in a 50 lb. lap at the time of making the lap. Under such conditions then, all the attendant has to do is to adjust the evener screw on the lapper or picker to make the lap weigh 51 pounds, the attendant being governed entirely by this instrument as to what weight he should make his laps. Now on the other hand, should the mill use as a standard lap weight say 46 lbs. the thumb nut 13 would be operated to swing the pointer to weight No. 46 on the scale, when atmospheric conditions are normal, but a further adjustment is required through the medium of the nuts 14 since the same humidity conditions would move the pointer too far to the wet side; in this example the inner end of the hygroscopic element 11 would be moved farther away from the pivot 7 in order to give to the pointer a slightly less movement toward the wet side. The graduation on the scale being constant, it will be seen that in the first instance the atmospheric conditions are changed to the extent of 1% additional regain then the pointer would be moved to 50½ on the scale since 1% regain would equal ½ lb. to a 50 lb. lap; while in the other case, under similar conditions, the pointer should not move quite this far since 1% of 46 is less than 1% of 50. It will therefore be seen that an instrument should be provided not only with means for adapting it to laps of different weights, but also with means for changing the sensitivity of the instrument at each weight.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means.

I claim:

1. In a lap weight indicator, a lap weight scale, a pivoted pointer member adapted to work over said scale and having a threaded extension beyond its pivot, means tending to swing said pointer toward the wet end of the scale, a hygroscopic member and means whereby one end thereof is secured to the aforesaid extended end of the pointer member in a manner to be adjusted therealong to thus vary the movement of the pointer member for any given increase or decrease in length of the hygroscopic member, and means attached to the other end of said hygroscopic member for manually bodily adjusting it for the purpose set forth.

2. In a lap-weight indicator, a lap-weight scale, a pivoted pointer member adapted to work over said scale and having an extension beyond its pivot, means tending to swing said pointer toward the wet end of the scale, a hygroscopic member and means whereby one end thereof is secured to the aforesaid extended end of the member in a manner to be adjusted therealong to thus vary the movement of the pointer member for any given increase or decrease in the length of the hygroscopic member, and means attached to the other end of said hygroscopic member for bodily adjusting it for the purpose set forth.

3. In a lap-weight indicator, a lap-weight scale, a pivoted pointer member adapted to work over said scale and having an extension beyond its pivot, means tending to swing said pointer toward the wet end of the scale, a hygroscopic member and means whereby one end thereof is secured to the aforesaid extended end of the member in a manner to be adjusted therealong to thus vary the movement of the pointer member for any given increase or decrease in the length of the hygroscopic member, and means for anchoring the other end of said hygroscopic member.

WILLIAM HOSAH TROGDON.